April 28, 1942.    W. H. BASELT    2,281,536
BRAKE ARRANGEMENT
Filed Sept. 8, 1939    3 Sheets-Sheet 1
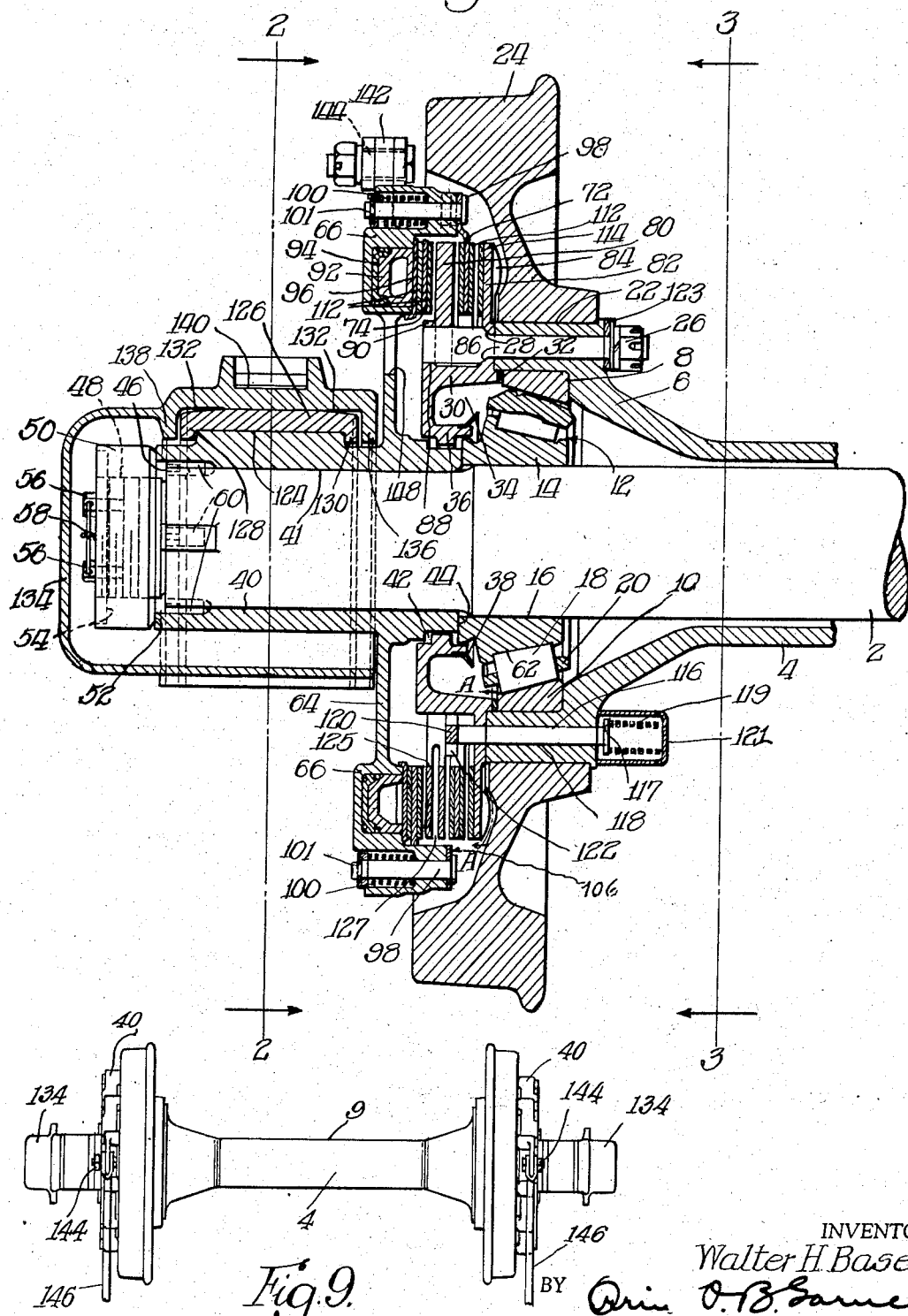
INVENTOR.
Walter H. Baselt,
BY
ATTORNEY.

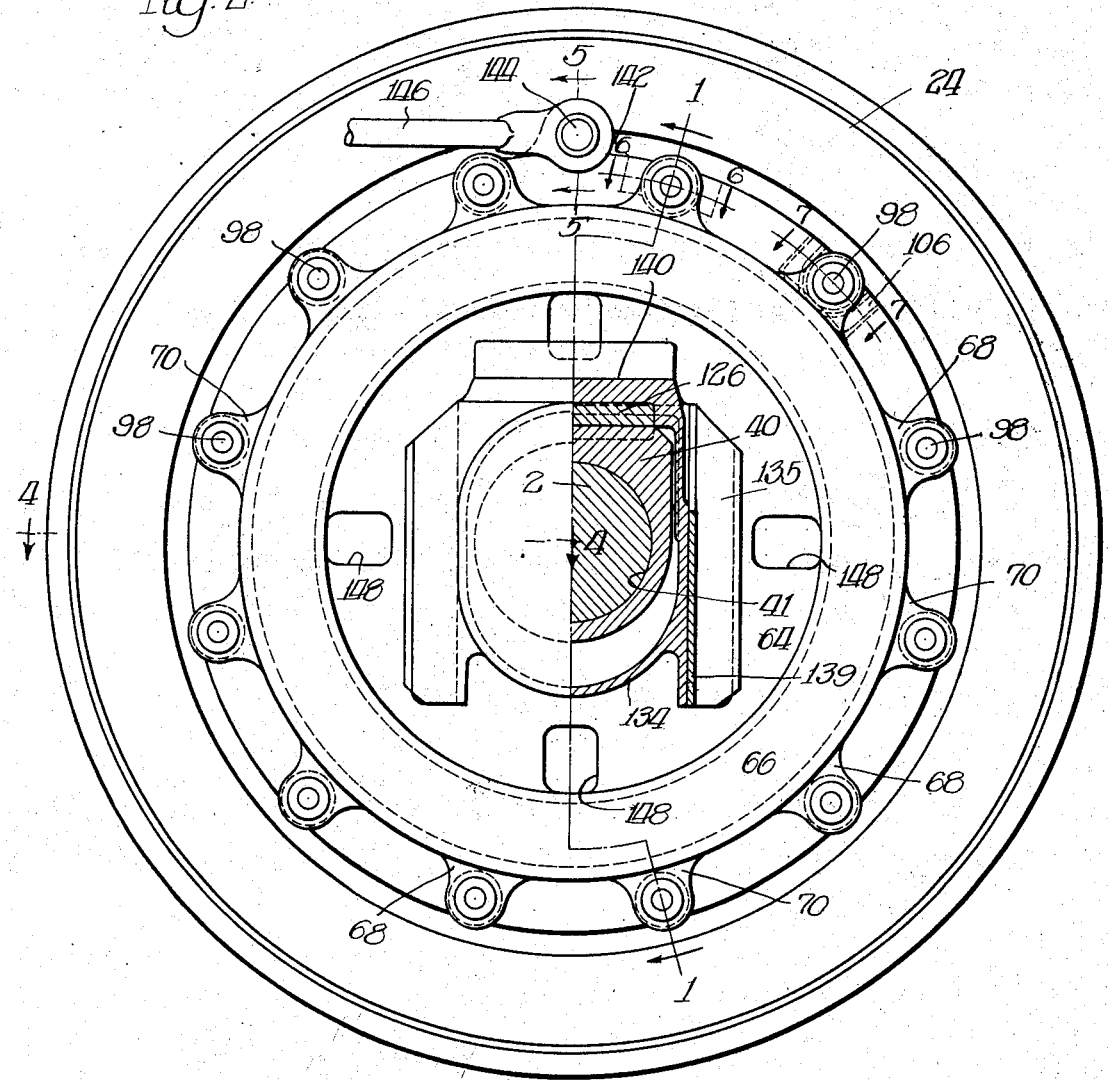
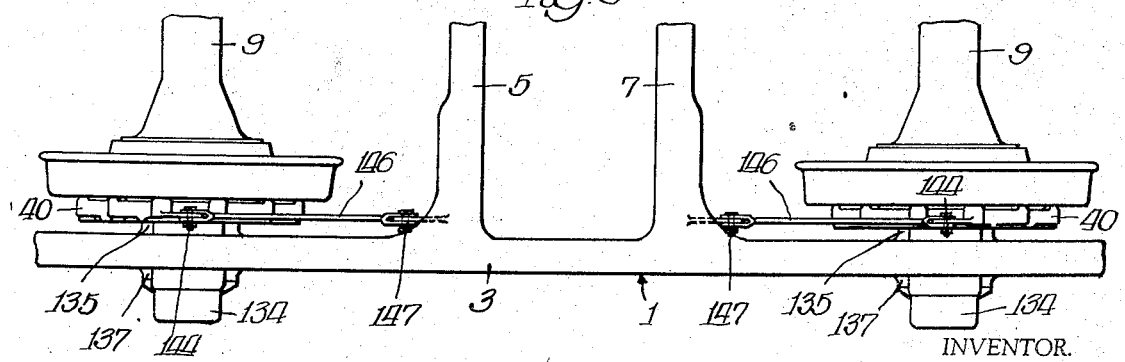

April 28, 1942.  W. H. BASELT  2,281,536
BRAKE ARRANGEMENT
Filed Sept. 8, 1939  3 Sheets-Sheet 3
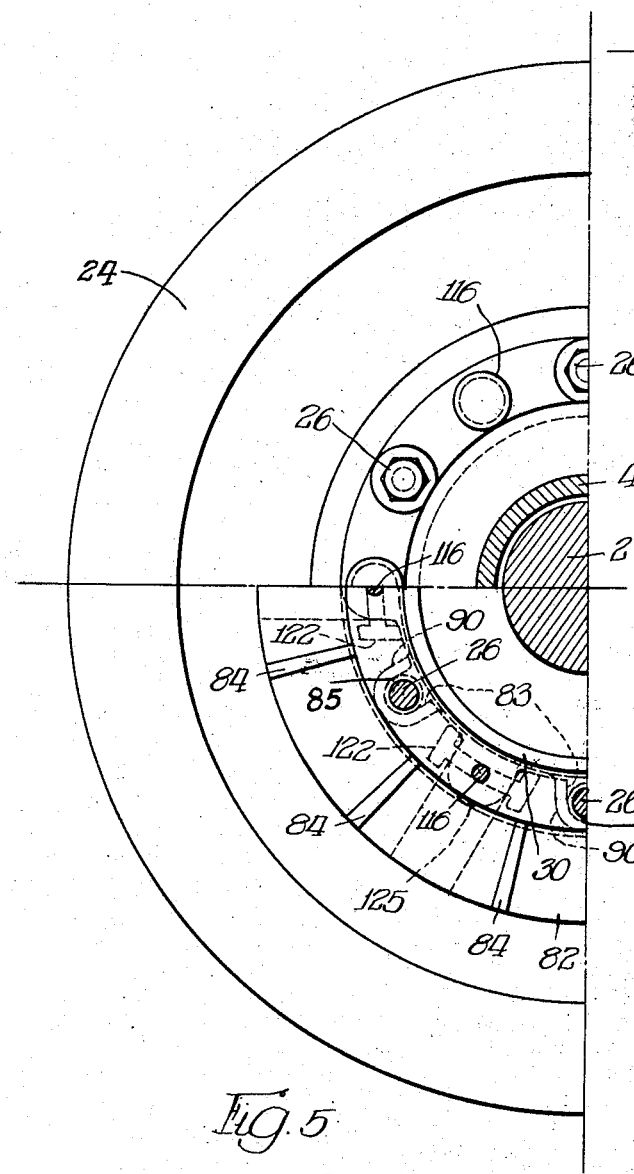
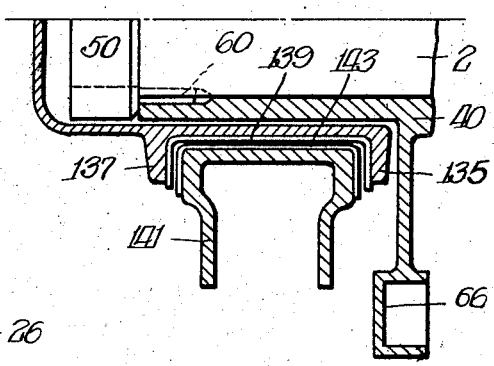
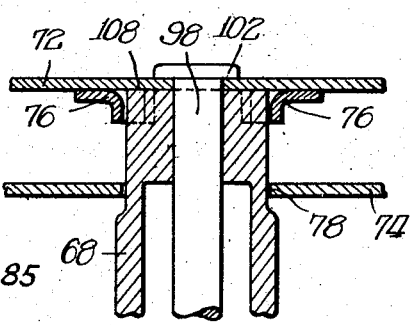
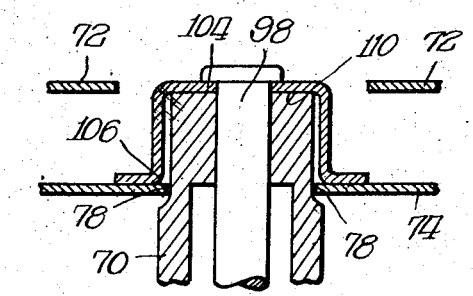
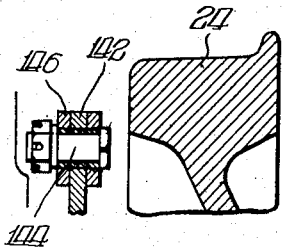
INVENTOR.
Walter H. Baselt,
BY
ATTORNEY.

Patented Apr. 28, 1942

2,281,536

UNITED STATES PATENT OFFICE 2,281,536

BRAKE ARRANGEMENT

Walter H. Baselt, Chicago, Ill., assignor to American Steel Foundries, Chicago, Ill., a corporation of New Jersey Application September 8, 1939, Serial No. 293,914

24 Claims. (Cl. 188—153)

My invention relates to vehicle brakes and more particularly to a form of brake suitable for application either to a railway vehicle or to a land vehicle. The modification illustrated and described is shown as applied to a railway vehicle.

With the increased speed developed in modern railway trains, additional braking areas have been afforded, sometimes used as supplemental to the braking areas conventionally used on the tread surfaces of wheels.

An object of my invention is to devise a novel form of brake means for a railway wheel and axle assembly wherein the braking surfaces will be arranged on discs supported in part by the wheel.

Another object of my invention is to design a practical form of braking means for a well known type of anti-friction wheel and axle assembly suitable for use on railway cars or on land vehicles.

A different object of my invention is a novel form of disc braking means of rotor type wherein stator means will be supported from an inner axle and rotor means supported from an outer axle.

My invention comprehends an arrangement wherein an outer wheel and axle assembly is sleeved over an inner normally non-rotating axle with rotor means supported from the outer rotating wheel and axle assembly and stators supported from the projecting journal end of the normally non-rotating inner axle, said inner axle serving also as a means of connection to the truck frame.

My invention contemplates such an arrangement as that above described wherein anti-friction bearings are supported between the rotating outer axle and the normally non-rotating inner axle with means of adjustment for said bearings located at the projecting journal end of the inner axle and thus easily accessible.

A different object of my invention is such an arrangement as that above described wherein the power means for operating the brakes may also be supported from the projecting end of the inner axle.

Various other objects and features of my novel design are more clearly set forth in the accompanying specification and the associated drawings as well as in the attached claims.

Figure 1 is a sectional view, transversely of the truck, through a railway wheel and axle assembly embodying my invention, the section being taken substantially in the planes indicated by the line 1—1 of Figure 2;

Figure 2 is an end elevation, partly in section, of the wheel and axle assembly structure shown in Figure 1, the section being taken substantially in the plane indicated by the line 2—2 of Figure 1;

Figure 3 is a view in elevation and partly in section taken in the plane indicated by the line 3—3 of Figure 1, the section at the lower half of the figure being taken as indicated by the line A—A of Figure 1;

Figure 4 is a sectional view taken in the horizontal plane indicated by the line 4—4 of Figure 2;

Figure 5 is a sectional view taken through the connection to the torque arm substantially as indicated by the line 5—5 of Figure 2; and Figures 6 and 7 are sectional views through the connecting studs by which the stators are supported.

Figure 8 is a stop plan view of reduced size showing application of my novel brake arrangement to a railway car truck, only one-half of the truck structure being shown inasmuch as the arrangement is similar on opposite sides thereof.

Figure 9 is a reduced plan view of one of the wheel and axle assemblies utilized in my novel arrangement as well as the brake mechanism associated therewith, the truck frame being removed and the torque arms associated with said mechanism being broken off adjacent their junctures with said frame.

Describing my novel structure in greater detail, the truck frame 1 (Figure 8) comprises the side member 3 of usual form with the integral spaced transoms 5 and 7 serving as the usual means of support for a bolster (not shown). Each supporting wheel and axle assembly 9 comprises the inner axle 2 and the outer axle 4 sleeved thereover, said outer axle having a bell-like end 6 with a shoulder at 8 forming a seat for the outer race or cup 10 of the anti-friction bearing generally indicated at 12, said bearing comprising the inner race or cup 14 having a press fit as at 16 on the inner axle 2 with the series of rollers 18, 18 held in normal spaced relationship between said races by the cage 20. Press fitted on the outer axle as at 22 is the wheel 24 and adjacent the outer circumference of the bell-like end 6 of the outer axle 4 is carried a series of threaded bolts 26, 26, each formed with a tapered shoulder as at 28 serving as a seat for said bolt against the closure plate 30, said bolts thus serving as retaining means for the closure plate and drawing it into tight fit as at 32 against the cup race of the roller bearing. The closure plate 30 affords a cover for the lubricant cavity 34 and has the inwardly directed annular flange 36 forming support means for the oil deflector 38, said flange 36 also affording, in conjunction with the inboard end of the cylinder casting 40, a labyrinthin passage as at 42 to prevent the escape of lubricant. My novel braking means associated with each wheel comprises the cylinder casting 40 sleeved over the end of the inner axle 2 and having a sliding fit therewith as at 41 with its inner end in abutment as at 44 against the outboard end of the cone 14, thus serving as adjusting means therefor. The outer end of the cylinder casting 40 extends slightly beyond the shoulder 46 defining the threaded end of the inner axle, said threaded end having engagement as at 48 with the securing nut 50, said securing nut having an annular abutment as at 52 with the projecting outboard end of said cylinder casting whereby said threaded nut may serve as a means of adjustment of the anti-friction bearing 12. The securing nut 50 may be held in position by a retaining bar 54 extending transversely across the end thereof in slots provided as required, said retaining bar being held in position against said nut by the stud bolts 56, 56 threaded into the end of the inner axle and secured against loosening as at 58. I may prevent relative rotation between the inner axle 2 and the cylinder casting 40 as by a series of keys indicated at 60, 60, but this keying feature may be omitted when it is desired to permit some rotation of the inner axle 2 in order to allow successive portions of the surface of the cone 14 to serve in the areas where the load is concentrated, as indicated at 62 (Figure 1).

The cylinder casting 40 has integrally formed adjacent its inboard end the disc 64 supporting at its outer perimeter the integrally formed ring type cylinder 66. At the outer perimeter of the cylinder 66 is formed a series of inwardly directed studs 68, 68 in alternate arrangement with the series of studs 70, 70 serving as retaining means respectively for the inboard stator 72 and the outboard stator 74. When under load the torque of the stator 72 is taken by ribs 76, 76 welded to the stators at opposite sides of the stud 68. The torque from the stator 74 may be taken as at 78, 78 against the studs 68 and 70. Interleaved between the stators 72 and 74 is the rotor 80 and between the plate of the wheel 24 and the stator 72 is positioned the rotor 82. The rotor 82 is integrally formed as an annular flange radially projecting from the closure plate 30 and on its inboard face has formed a series of fan ribs 84, 84 serving as air circulating means. The closure plate retaining bolts 26, 26 are formed with elongated heads as indicated at 86, each having bearing at its extremity as at 88 in the aligned lug 90 radially formed at the outer edge of the closure plate. The series of bolts 26, 26 thus take the load in shear as the rotors 80 and 82 are brought into operation when the brakes are applied. The rotor 80 has a series of slots 83, 83 (Figure 3) formed about its inner perimeter whereby it may have sliding engagement as at 85 axially of the structure with the securing bolts 26, 26. The cylinder 66 has the ring-type piston 92 with the packing ring indicated at 94, said piston having abutment as at 96 against the stator 74.

Movement axially of the wheel and axle assembly is afforded for the stators 72 and 74 by their manner of connection to the studs 68 and 70 respectively. Each stud (68 and 70) is hollow and encloses a release spring plunger 98, each of said plungers having sleeved around it a compression spring 100 with retaining means therefor as at 101, said springs operating as release means to move said stators axially into their normal position as the brakes are released. The plungers 98 associated with the studs 68 are connected as indicated at 102 (Figure 6) to the stator 72. In alternate arrangement the plungers 98 associated with the studs 70 are connected as indicated at 104 through the welded straps 106 to the stator 74. Each stator is thus operated axially by an independent set of release springs. The inboard stator 72 is in normal position when seated against the inboard ends of the studs 68 as indicated at 108 and the stator 74 is in normal position when the straps 106 are seated as at 110 against the ends of the studs 70. Each of the stators 72 and 74 is afforded wear plates on its opposite surfaces as indicated at 112, 112, said wear plates having the somewhat lesser diameter than the stators as best seen in the sectional view of Figure 1. The wear plate 114 (Figure 1) is also afforded for the rotor 82. Friction surfaces may be replaced as required by the removal of said wear plates.

The rotor 80 is retained in its normal axial position as shown in Figure 1 by the series of plungers 116, 116 alternate in position with the securing bolts 26, 26 in the bell-like end 6 of the outer axle 4. The plungers 116 have sliding engagement as at 118 within the outer axle and extend through the rotor 82 to have abutment as at 120 (Figure 1) with the rotor 80. The heads of the plungers 116 have abutment as at 117 with the compression release springs 119, each of which is housed within a casing 121 formed as a part of the ring washer 123.

The inner perimeter of the rotor 80 is a series of U-shaped slots 125, 125. In application said rotor may be turned to align said slots with the lugs 90 on the closure plate 30, thus enabling the rotor 80 to be applied or removed over said closure plate while said closure plate remains in position. The series of slots 125, 125 affords added means for air circulation and, for additional cooling, the rotor 80 is slotted radially around its outer perimeter as indicated at 127 (Figure 1). The said slotted structure of the rotor 80, however, necessitates a special form of head 122 on the plungers 116 to afford bearing thereagainst as at 120 and said heads are formed as H-like structures bridging the slots already referred to as best seen in the sectional view of Figure 3. When it is desired to assemble or remove the wear plates, some of the closure plate bolts 26, 26 may be removed and replaced by flat head bolts having engagement as at 28 with the closure plate 30 to retain it in position. Thereafter, the remainder of the bolts 26 may be removed after which the cylinder casting 40 together with the stators 72 and 74 and the rotor 80 may be removed off the end of the inner axle 2 without disturbing the anti-friction bearing 12 or the closure plate. Such an arrangement is necessary in order to retain the bearing assembly in position and the lubricant cavity intact.

The top of the cylinder casting 40 affords a seat as at 124 for the bearer 126, said bearer being flanged over at its inboard and outboard edges as at 128 and 130 for abutment with shoulders formed on said casting (Figure 1). The top of the bearer 126 is slightly crowned as at 132, thus affording rocking movement for the journal housing or box 134 which is seated thereon, said housing having at its inboard edge a flange 136 which together with the rib 138 (Figure 1) afford positioning means for said housing with respect to said bearer 126. The top of the housing 134 may afford a seat as at 140 for a frame member of the supported truck. The journal box 134 is formed with inner and outer pedestal jaws 135 and 137 (Figure 4) with the wear plate 139 forming a means of connection to the frame member 141, said frame member likewise being afforded a wear plate 143 in the usual manner.

The cylinder casting 40 has integrally formed thereon the lug 142 forming a pivotal means of torque connection as at 144 to the pull rod 146, said pull rod having a connection as at 147 to the side frame 3 adjacent its juncture with the transom, as best shown in the top plan view of Figure 8.

In operation, actuation of the power means 66 moves the ring piston 92 in an inboard direction against the stator 74 thus bringing it into engagement with the rotor 80 and successively moving axially the rotor 80 and the stator 72 until the rotor and stators are brought into a pile against the rotor 82 with their brake surfaces in frictional engagement with each other. The power means 66 may be controlled as desired to increase or decrease the amount of friction developed between said rotors and stators. Release of the power means will permit the parts to assume their normal position by operation of the release springs associated with the stators 72 and 74 and with the rotor 80 as already described. It may be noted that I have provided forced ventilating means for my novel braking arrangement; said ventilation is facilitated by the series of openings 148, 148 formed in the disc 64 adjacent the cylinder 66. It may be further observed that the release springs 108 and 119 are remotely positioned with respect to the friction surfaces, thus protecting them as far as possible from the heat developed by brake applications. This particular feature is essential for proper functioning of the braking system.

It is to be understood that I do not wish to be limited by the exact embodiment of the device shown which is merely by way of illustration and not limitation as various and other forms of the device will of course be apparent to those skilled in the art without departing from the spirit of the invention or the scope of the claims.

I claim:

1. In a vehicle, a frame member, a supporting wheel and axle assembly having an outer axle, a wheel fixed thereon, an inner axle sleeve within said outer axle, anti-friction bearings between said axles, a rotor supported from said wheel, a stator supported from said inner axle, and means operative to move said rotor and stator axially into engagement, said operating means comprising a cylinder casting adjustably sleeved on said inner axle in abutment with said bearing, a cylinder integrally formed therewith, and a piston in said cylinder operable to move said stator into engagement with said rotor.

2. In a vehicle, a frame member, a supporting wheel and axle assembly, and braking means for said wheel, said assembly comprising an outer rotating axle, a wheel fixed thereon, an inner non-rotating axle, and anti-friction bearings between said axles, said braking means comprising interleaved rotors and stators supported respectively from said wheel and said inner axle, and operating means for moving said rotors and stators into a pile for frictional engagement, said operating means comprising a ring cylinder slidably supported on said inner axle.

3. In a vehicle, a frame member, a supporting wheel and axle assembly, and braking means for said assembly, said assembly comprising a rotating axle, a wheel fixed thereon, a normally non-rotating axle, anti-friction bearings between said axles, said braking means comprising a rotor supported from said wheel and a stator supported from said non-rotating axle, and means for actuating said braking means, said actuating means comprising a ring cylinder adjustably supported on said non-rotating axle and a torque arm connected between said cylinder and said frame member.

4. In a vehicle, a frame member, a wheel and axle assembly comprising an outer axle, a wheel thereon, and an inner axle projecting outwardly of said wheel, interleaved rotors and stators supported respectively from said wheel and said projecting end, and means operable to bring said rotors and stators into engagement with each other, said operating means comprising a cylinder casting sleeved on said projecting end, a bearer thereon for support of said frame member, and a torque arm connected between said casting and said frame member.

5. In a vehicle, a frame member, a supporting wheel and axle assembly having an outer axle, a wheel fixed thereon, an inner axle sleeved within said outer axle, anti-friction bearings between said axles, a rotor supported from said wheel, a stator supported from said inner axle, and means operative to move said rotor and stator axially into engagement, said operating means comprising a cylinder casting sleeved on the end of said inner axle in abutment with said anti-friction bearing, and means on the end of said inner axle operable to adjust the axial position of said casting.

6. In a vehicle, a frame member, a supporting wheel and axle assembly, and braking means for sa'd wheel, said assembly comprising an outer rotating axle, a wheel fixed thereon, an inner non-rotating axle, and anti-friction bearings between said axles, said braking means comprising interleaved rotors and stators supported respectively from said wheel and said inner axle, a ring type cylinder for moving said rotors and stators into a pile for frictional engagement, and independent release means for the respective stators alternately mounted around the outer periphery of said cylinder.

7. In a vehicle, a frame member, a supporting wheel and axle assembly, and braking means for said wheel, said assembly comprising an outer rotating axle, a wheel fixed thereon, an inner nonrotating axle, and anti-friction bearings between said axles, said braking means comprising interleaved rotors and stators supported respectively from said wheel and said inner axle, means for moving said rotors and stators into frictional engagement, and independently operating release means for the respective stators alternately mounted about the periphery of said power means.

8. In a vehicle, a frame member, a wheel and axle assembly comprising an outer axle, a wheel thereon, and an inner axle projecting outwardly of said wheel, interleaved rotors and stators supported respectively from said wheel and said projecting end, and means operable to bring said rotors and stators into engagement with each other, said operating means comprising a cylinder casting sleeved on said projecting end, and a bearer thereon for support of said frame member.

9. In a vehicle, a frame, a supporting wheel and axle assembly comprising an outer axle, a wheel thereon, an inner axle having a journal end, rotors and stators supported respectively from said wheel and said journal end, and actuating means for moving said rotors and stators axially into engagement, said actuating means comprising a cylinder casting sleeved on said journal end, a ring cylinder integrally formed therewith around said inner axle, and a torque are connected between said casting and said frame.

10. In a vehicle, a frame member, a supporting wheel and axle assembly having an outer axle, a wheel fixed thereon, an inner axle sleeved within said outer axle, anti-friction bearings between said axles, a rotor supported from said wheel, a stator supported from said inner axle, and means operative to move said rotor and stator axially into engagement, said operating means comprising a cylinder casting sleeved on the end of said inner axle in abutment with said anti-friction bearing.

11. In a vehicle, a frame member, a supporting wheel and axle, braking means comprising a plurality of rotors supported from said wheel, a plurality of stators supported from said axle, and means for moving said stators and rotors into a compact pile for frictional engagement, said moving means comprising a cylinder supported from said axle with a torque arm directly connected between said cylinder and said frame member.

12. In a vehicle, a frame member, a supporting wheel and axle, braking means comprising a plurality of rotors supported from said wheel, a plurality of stators supported from said axle, and means for moving said stators and rotors into a compact pile for frictional engagement, said moving means comprising a ring cylinder supported around said axle and a torque arm directly connecting said cylinder and said frame member.

13. In a vehicle, a frame member, a supporting wheel and axle assembly including an outer axle, a wheel thereon, an inner axle, an anti-friction bearing between said axles, a rotor plate on said wheel, a cylinder casting sleeved on said inner axle in abutment with said bearing, a stator plate supported from said casting, and means on said casting operable to move said stator into engagement with said rotor.

14. In a vehicle, a frame member, a supporting wheel and axle assembly of anti-friction type including a normally rotating wheel and a normally non-rotating inner axle, a rotor fixed on said wheel, a cylinder casting sleeved on said inner axle and supporting a stator, means on said casting operable to move said stator into engagement with said rotor, and a torque arm connected between said casting and said member.

15. In a vehicle, a frame, a supporting wheel and axle assembly comprising an outer axle with a wheel thereon, an inner axle, an anti-friction bearing between said axles, a cylinder casting adjustably sleeved on said inner axle in abutment with said bearing, a stator supported from said casting, a rotor supported on said wheel, and means on said casting operable to move said stator into engagement with said rotor.

16. In a vehicle, a frame, a supporting wheel and axle assembly comprising an outer axle, wheels thereon, an inner axle, rotors and stators outwardly of said wheels and supported respectively from said wheels and said inner axle, and actuating means adjustably supported on said inner axle for moving said rotors and stators axially into engagement.

17. In a vehicle, a frame member, a supporting wheel and axle assembly comprising a wheel and inner and outer axles, rotatable braking elements supported from said wheel, stationary braking elements supported from one of said axles, power means supported from the last-mentioned axle for urging said elements into frictional engagement, and release means inboard and outboard of the wheel for said elements.

18. In a vehicle, a frame member, a supporting wheel and axle assembly comprising a wheel and inner and outer axles, braking means between said member and said wheel and comprising rotatable elements supported from said wheel, stationary elements supported from one of said axles, power means mounted on said inner axle for urging said elements into frictional engagement, and independently operating release means for the respective stationary elements alternately mounted about the periphery of said power means.

19. In a vehicle, a frame member, a supporting wheel and axle assembly and braking means for said wheel, said assembly comprising an outer axle, a wheel fixed thereon, an inner axle, bearings between said axles, a closure plate secured to said wheel, said braking means comprising interleaved rotors and stators supported respectively from said closure plate and said inner axle, a cylinder for moving said rotors and stators into a pile for frictional engagement, and release means for the respective stators alternately mounted around said cylinder.

20. In a vehicle, a frame member, a supporting wheel and axle assembly and braking means for said wheel, said assembly comprising an outer axle, a wheel fixed thereon, an inner axle, anti-friction bearings between said axles, a closure plate, said braking means comprising rotors supported from said wheel and said closure plate, stators supported from said inner axle, operating means in the form of a ring cylinder for moving said rotors and stators into a pile for frictional engagement, and release means for respective stators alternately mounted about the periphery of said cylinder.

21. In a vehicle, a frame member, a wheel and axle assembly comprising an outer axle, a wheel thereon, and an inner axle projecting outwardly of said wheel, interleaved rotors and stators supported respectively from said wheel and said projecting end, means operable to bring said rotors and stators into engagement with each other comprising a cylinder casting sleeved on said projecting end, and release means for said stators on said casting.

22. In a vehicle, a frame member, a wheel and axle assembly comprising a wheel and inner and outer axles, interleaved rotors and stators supported respectively from said wheel and said inner axle, means operable to bring said rotors and stators into engagement with each other comprising a ring cylinder sleeved on said inner axle, and independent release means for the respective rotors alternately mounted about the periphery of said cylinder.

23. In a vehicle, a frame member, a wheel and axle assembly comprising a wheel and inner and outer axles, interleaved rotors and stators supported respectively from said wheel and said inner axle, means operable to bring said rotors and stators into engagement with each other, air circulating means on one of said rotors, said operable means comprising a ring cylinder, and release means for respective stators alternately mounted about the periphery of said cylinder.

24. In a vehicle, a frame member, a supporting wheel and axle assembly comprising a wheel and inner and outer axles, braking means comprising rotatable elements supported from said outer axle and stationary elements supported from said inner axle, operable means for bringing said elements into frictional engagement with each other, and torque transmitting means connecting said operable means and said frame member, said operable means comprising a ring cylinder sleeved on said inner axle, and release means for respective stators alternately mounted about the periphery of said cylinder.

WALTER H. BASELT.

CERTIFICATE OF CORRECTION.

Patent No. 2,281,536.

April 28, 1942.

WALTER H. BASELT.

It is hereby certified that error appears in the printed specification of the above numbered patent requiring correction as follows: Page 1, second column, line 22, for "stop" read --top--; page 3, first column, line 62, claim 1, for "sleeve" read --sleeved--; page 4, first column, line 20, claim 9, for "are" read --arm--; and that the said Letters Patent should be read with this correction therein that the same may conform to the record of the case in the Patent Office.

Signed and sealed this 15th day of September, A. D. 1942.

Henry Van Arsdale,
Acting Commissioner of Patents.

(Seal)